United States Patent [19]

Cann

[11] Patent Number: 5,440,619
[45] Date of Patent: Aug. 8, 1995

[54] VOICE, DATA AND FACSIMILE MODEM WITH MODIFIED RINGBACK ANSWERING

[75] Inventor: Peter E. Cann, Cambridge, Mass.

[73] Assignee: Zoom Telephonics, Inc., Boston, Mass.

[21] Appl. No.: 106,126

[22] Filed: Aug. 11, 1993

[51] Int. Cl.$^6$ .............................................. H04M 11/00
[52] U.S. Cl. ......................................... 379/97; 379/93; 379/100
[58] Field of Search ............... 379/93, 94, 96, 97, 379/98, 100; 375/8, 9; 358/406, 468

[56] References Cited

U.S. PATENT DOCUMENTS

| | | | |
|---|---|---|---|
| 4,870,678 | 9/1989 | Adochi | 379/100 |
| 5,048,076 | 9/1991 | Maurer et al. | 379/94 |
| 5,065,427 | 11/1991 | Godbole | 379/100 |
| 5,280,519 | 1/1994 | Nakajima et al. | 379/100 |

OTHER PUBLICATIONS

Tucker, T., "TCI's Fax Line Manager," Teleconnect, pp. 139-140, Sep. 1990.

Primary Examiner—Curtis Kuntz
Assistant Examiner—Jason Chan
Attorney, Agent, or Firm—Hamilton, Brook, Smith & Reynolds

[57] ABSTRACT

A device and a method for processing voice, data and facsimile calls in a modem is described. When the modem receives a telephone call from a caller, it answers the call and sends back a modified ringback signal having a cadence and tone similar to those of the standard telephone company ringback signal. In a preferred embodiment, the initial tone burst of the modified ringback signal has a duration slightly longer than that of the standard ringback signal. If the calling device is a data modem or faxmodem programmed to communicate with the modem of the invention, it will recognize the modified ringback signal as a dial tone. The calling device is programmed such that if it receives the dial tone, it will transmit an identifying DTMF signal to the modem of the invention. After sending the modified ringback signal, the modem of the invention waits a predetermined period of time to identify the caller. If a facsimile calling tone, an identifying DTMF signal, or a European data modem calling tone is received, then the call is processed appropriately. If no signal is received after the predetermined period of time has elapsed, the call is processed as voice. During the wait period, a voice caller receiving the modified ringback signal will assume that the call is being processed and will not terminate the call.

34 Claims, 4 Drawing Sheets

VOICE, DATA AND FACSIMILE MODEM WITH MODIFIED RINGBACK ANSWERING

BACKGROUND OF THE INVENTION

A modem is a communication device which couples a computer to a telephone line to enable the computer to communicate with other computers. In recent years, faxmodems have been developed to enable their host computers to receive and transmit both facsimile and computer modem data over a single telephone line. Since data modems and facsimile machines or faxmodems use different data formats, the host must be able to identify an incoming call as either a facsimile type call or a data call so that it can process the incoming call appropriately.

The vast majority of facsimile machines presently in use transmit a calling tone to establish communication with a receiving device before the facsimile data is sent. Typically, data modems do not transmit a calling tone. So, a simple way to identify a caller as either facsimile or data is to wait for the facsimile calling tone. If it is not received within a predefined time frame, then it is assumed that the call is a data call and the receiving modem is configured to receive data. If the fax calling tone is received, the modem is configured to receive facsimile data.

A problem arises when it is desired to also process voice telephone calls on the same telephone line. Voice callers, like most data modems, do not send calling tones. So, it is difficult for a receiving device such as a modem to distinguish between a voice call and a data call. Also, if the receiving device answers the call and then requires a long period of time to determine what type of call it is, a voice caller may become discouraged and terminate his call.

SUMMARY OF THE INVENTION

Ordinarily, when a caller places a telephone call, the call is routed through the telephone operating company's central office. The central office sends a standard ring signal to the intended receiver of the phone call and simultaneously sends a standard ringback signal to the originator of the call. The ringback signal confirms to the caller that his call has reached the telephone of the intended receiver and that it has not yet been answered. The central office detects when the receiver answers the call. At that time, the central office connects the two telephone stations and terminates the ringback signal.

The present invention is directed to a modem and a method for processing telephone calls which are received on a single telephone line and which can be one of voice, data and facsimile type calls. When the device of the present invention receives an incoming telephone call, it sends to the caller a modified ringback signal which is similar to the standard ringback signal generated by the telephone company. Because of the similarity to the standard ringback signal, a voice caller will assume that either the call has not yet been answered or that it is being serviced. In any event, it is likely that the ringback signal will prevent a voice caller from terminating the telephone call. However, the modified ringback signal is sufficiently different from the standard ringback signal to cause calling devices such as a data modem or faxmodem to interpret it as a dial tone.

A calling device such as a data modem or a faxmodem which does not transmit facsimile calling tones can be programmed to call the device of the invention, to wait until it detects a dial tone and, if it does, to transmit to the device of the invention a unique dual-tone multiple-frequency (DTMF) signal which identifies the caller. A standard data modem can be programmed to transmit one DTMF signal while the faxmodem can be programmed to transmit a different DTMF signal. If the caller is a standard facsimile machine, it transmits its standard calling tone. If the caller is a European data modem, it will transmit a European data modem calling tone.

After the device of the invention generates the modified ringback signal, it waits a predetermined programmable wait period to receive the standard facsimile calling tone, the DTMF signal generated by a data modem or a faxmodem, or the European data modem calling tone. If one of the signals is received, the incoming call is processed accordingly. If, after the wait period, no signal is received by the device of the invention, then it is assumed that the call is a voice call and the call is processed accordingly.

In a preferred embodiment, the modem of the invention will be capable of detecting DTMF signals during output of a special tone burst of the modified ringback signal. However, some modems in accordance with the invention may not be able to do this. A calling device may send a long sequence of DTMF signals in anticipation of this situation. The modem of the invention prevents multiple DTMF signal reports from being sent to a host computer. After receiving a first DTMF signal, the modem does not make a report until it fails to receive another DTMF signal for a predetermined period of time. In the preferred embodiment, this period of time is approximately 300 milliseconds. If no DTMF signal is received within that period, then it is assumed that the last DTMF signal in the stream has been received.

Typically, modems and faxmodems are able to monitor call progress tones, i.e., busy signals, ringback signals, dial tones, etc. Each call progress tone is characterized by a unique cadence which defines the time of a tone burst and a silent period of the signal. For example, the cadence of a busy signal is a tone burst lasting for one-half second and repeating every second. A standard ringback signal is a two second tone burst followed by four seconds of silence repeating every six seconds. A dial tone is a constant tone having no silent time.

The calling devices which monitor ringback signals typically do so by sensing the energy in a spectral band which spans the frequencies of all of the call progress tones used by the telephone company and by detecting the cadence of energy pulses anywhere within the band without discriminating among the various frequencies. A standard ringback signal is simply recognized as a burst of energy in the band lasting for two seconds and repeating every six seconds. A busy signal is a one-half second burst every second. A dial tone is recognized as a tone which lasts longer than two seconds. In a preferred embodiment, the modified ringback signal of the invention has an initial tone burst duration of approximately 3.0 seconds and has the same spectral characteristics as the standard ringback signal. Because of the longer duration of the initial tone burst, a calling device such as a data modem or faxmodem, without regard for the frequency of the signal, will recognize it as a dial tone.

Human voice callers, on the other hand, do discriminate among frequencies of call progress tones. A human will more readily recognize the difference in frequency of call progress tones than he will a slight difference in cadence. A human caller is likely to recognize the modified ringback signal as being similar to a standard ringback signal because of the frequency of the tone bursts and will most likely assume that his call is being serviced and will not hang up.

Thus, the modified ringback signal of the invention serves at least two functions. First, it causes a suitably programmed and equipped calling device, such as a data modem or a faxmodem, to identify itself to the device. As long as the calling device is properly programmed, when it receives the modified ringback signal from the device of the invention, it will send back the unique DTMF signal to identify itself. If the caller is a voice caller, the predetermined wait period of the device will elapse before the phone call can be processed. The modified ringback signal tends to assure the caller that his call is being serviced and prevents him from hanging up before the device can process his call.

The pre-set programmable wait period is determined by the timing of programmed calling devices. In a preferred embodiment, the wait period is approximately 300 milliseconds beginning after the end of the initial tone burst of the modified ringback signal.

In another embodiment of the invention, the spectrum of the modified ringback signal is substantially identical to that of a standard dial tone. In that embodiment, the duration of the initial tone burst is once again slightly longer than that of the standard ringback signal. This accommodates data modems and faxmodems which do discriminate among spectral features of call progress tones. Such devices would recognize this modified ringback signal as a dial tone. At the same time, the signal is still sufficiently similar to a standard ringback signal so that a voice caller will likely conclude that either his call has not been answered or that it is being serviced.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
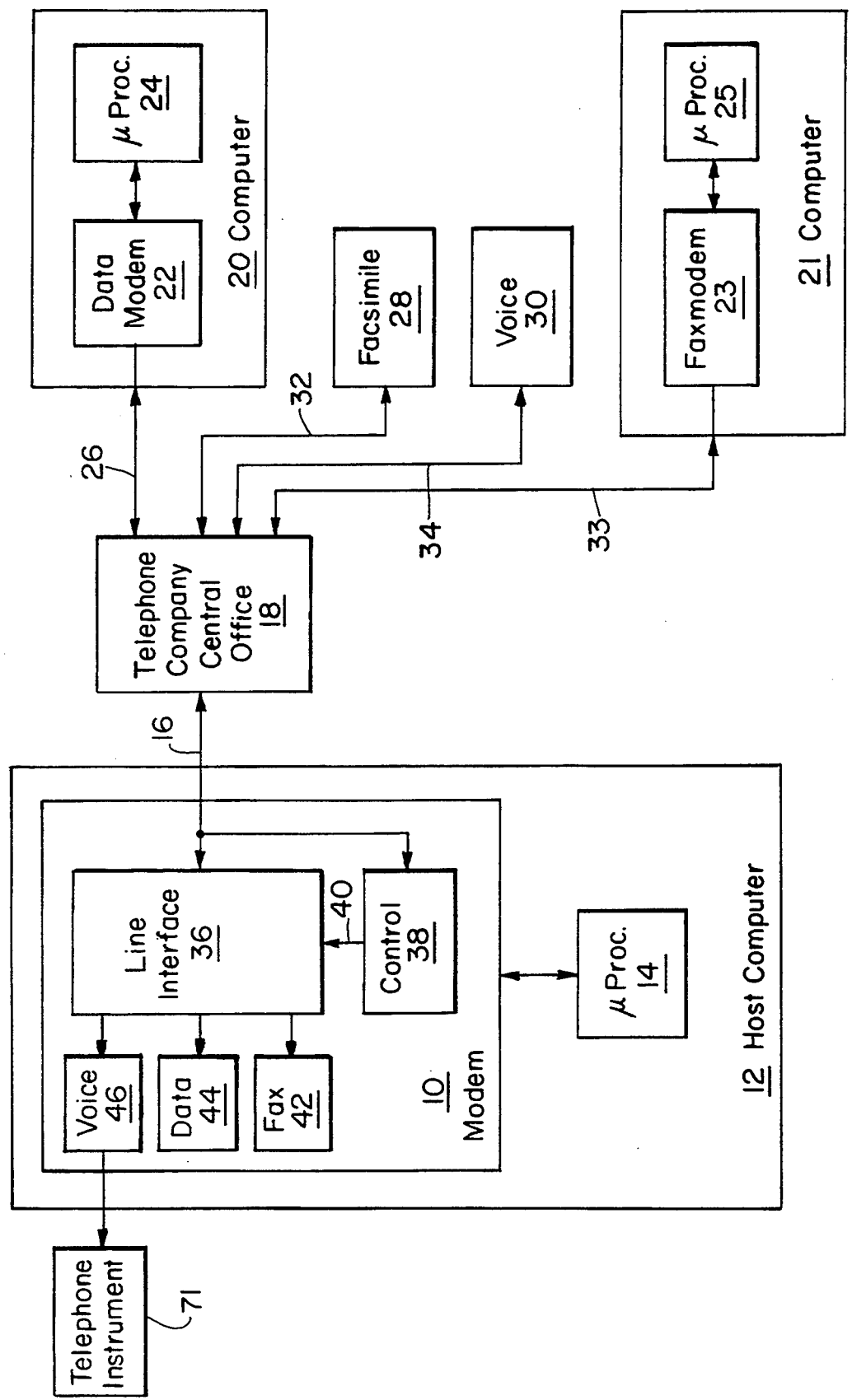
FIG. 1 is a block diagram of a communication system using the modem of the present invention.

FIG. 1 is a functional block diagram which depicts the operation of the device of the present invention within a telephone system. It should be noted that any correspondence between the functional blocks shown in the figure and actual hardware is merely coincidental since the purpose of the drawing is to show functions rather than actual hardware. The modem 10 of the present invention is shown within a host computer 12. The host computer 12 also comprises a controlling or processing function 14 which interfaces with the modem 10. Alternatively, the modem 10 could be located external to the host computer 12.

The modem 10 and hence the host computer 12 are connected to the telephone operating company central office 18 via a telephone line 16. A computer 20 having a data modem 22 and microprocessor 24 are interfaced to the central office 18 by a telephone line 26. A computer 21 having a faxmodem 23 and a microprocessor 25 are interfaced to the central office 18 by a telephone line 33. The term "faxmodem" as used herein refers to a modem which transmits and receives data over phone lines in a facsimile data format. Like data modems, the faxmodem referred to herein does not transmit an identifying calling tone but it is capable of monitoring call progress tones and transmitting DTMF signals. In actuality, most faxmodems do transmit facsimile calling tones when transferring data in facsimile format. For purposes of illustration, the faxmodem referred to herein does not transmit facsimile calling tones. It will also be understood that the term includes devices which can communicate in multiple data formats such as that used by standard data modems. A facsimile machine 28 and a voice machine such as a telephone 30 are interfaced to the central office by telephone lines 32 and 34, respectively.

Telephone signals enter the modem 10 of the invention at a line interface 36 which receives the ring and then, after the telephone call is answered, receives the message from the caller over the telephone line 16. The call is also received by a control 38 which is capable of recognizing DTMF signals and various calling tones including facsimile calling tones and European data modem calling tones. A control signal 40 from the control circuit 38 selects a processing function 42, 44, 46 which will process the incoming telephone call.

Typically, a calling data modem 22 is controlled by its host computer 20 via an interface with a microprocessor 24 within the computer. In the same fashion, a faxmodem 23 is controlled by its host computer 21 via an interface with a microprocessor 25. To send data over the phone line 26, 33, the microprocessor 24, 25 sends a dial string to the modem 22 or faxmodem 23 followed by the data to be transmitted on the phone line. The dial string is a series of data and commands which implement the functions of the modem 22 or faxmodem 23. It typically includes the phone number of the intended receiver as well as various required modem commands.

Generally, the data modem 22 and the faxmodem 23 do not transmit calling tones when they communicate with other devices. This makes it difficult for a receiving device to identify a call as being from a voice caller, a data modem caller, or a faxmodem caller. However, if the calling data modem 22 or faxmodem 23 is programmed with the appropriate dial string, the modified ringback signal of the modem 10 of the invention will cause the calling data modem 22 or faxmodem 23 to transmit a DTMF signal which will identify itself. In one embodiment, the data modem 22 is programmed to transmit a digit "6" DTMF signal and the faxmodem 23 is programmed to transmit a "3."

To accomplish this, the microprocessor 24, 25 of the computer 20, 21 generates and transmits an appropriate dial string to the data modem 22 or faxmodem 23. In one embodiment, the appropriate dial string for calling the modem 10 comprises the telephone number followed by command codes which cause the modem to transmit the DTMF signal if it recognizes the modified ringback signal from the modem 10. An example of such a dial string for the data modem 22 is 123-4567W6666666666666666.

For the faxmodem 23, the corresponding dial string would be 123-4567W3333333333333333.

In these dial strings, 123-4567 is the telephone number of the modem 10 of the invention. The command code W represents the Wait-For-Second-Dial-Tone command. Each of the 6s or 3s is a command to the data modem 22 or faxmodem 23, respectively, to dial that DTMF signal digit.

To initiate a data transfer in accordance with this dial string, the modem 22 or faxmodem 23 first dials the phone number 123-4567. It then executes the W command in the dial string by monitoring the line for call progress tones and waiting to receive a dial tone. As described below, when the modem 10 receives the phone call, it answers the call and sends back the modified ringback signal. In a preferred embodiment, the signal has the same sound or spectral features as a standard ringback signal and at least its initial tone burst is slightly longer than those of the standard ringback signal. In one preferred embodiment, the duration of the tone burst is approximately 3.0 seconds.

The calling modem 22 or faxmodem 23 receives this ringback signal and observes it. When it recognizes that the initial tone burst of the signal is longer than two seconds, it concludes that the signal is a dial tone and then proceeds to execute the next instructions in the dial string, that is, it transmits the string of DTMF signals. In a preferred embodiment, there are 17 DTMF signals transmitted, each having a duration of approximately 95 milliseconds, and being separated in time by approximately 95 milliseconds. Therefore, during the 300 millisecond wait period of the modem 10, a DTMF signal will be received.

In another embodiment, the dial strings for the data modem 22 and faxmodem 23 are, respectively,

```
1 2 3 - 4 5 6 7 W , , 6
1 2 3 - 4 5 6 7 W , , 3 .
```

In these dial strings, two commas are inserted between Wait-for-Second-Dial-Tone command and the DTMF signal command. The two commas represent a four-second total delay during which the modem 22 or faxmodem 23 does nothing. The delay accommodates the circuitry of the modem 10 of the invention as described below. At the end of the delay, the modem 22 or faxmodem 23 transmits the appropriate DTMF signal which will be recognized by the modem 10 to identify the caller. Where this longer four-second delay is used, the programmable wait period of the modem 10 of the invention is set for a longer time, preferably 5.0 seconds.

After the modem 10 receives a DTMF signal and the wait period expires, the modem 10 will establish a link with the modem 22 or faxmodem 23 by initiating the appropriate handshaking routine. When the link is established, the modem 22 or faxmodem 23 can forward the data to the modem 10.

Many data modems presently in use in Europe do transmit calling tones. The modem 10 can be designed to recognize these European modem calling tones. If the modem 10 detects such a calling tone during the wait period, it will select data mode processing 44 for the incoming telephone call. It then implements the appropriate handshaking routine to establish the link with the calling modem.

When a facsimile machine 28 places a call to the modem 10, once again, the modem 10 first answers the call, and the facsimile machine 28 outputs its calling tones. Under specifications set forth by the CCITT (International Consultative Committee for Telephone and Telegraph), a facsimile machine is required to transmit a calling tone having a frequency of 1100 Hz, a duration of 0.5 second, and a repetition period of three seconds. The modem 10 is designed to recognize this signal. After sending the extended initial tone burst of the modified ringback signal, if the modem 10 receives the fax calling tone, it selects facsimile processing 42 for the telephone call.

If the originator of the call is a voice caller 30, he will first hear the standard telephone ringback signal after he dials the phone number. After the modem 10 answers the phone, the caller will then hear the modified ringback signal. The caller will most likely assume that the call has not yet been answered or, if he detects the difference in duration of the initial tone burst, he may assume that the call has been answered but has been "transferred" to another line. In either case, it is likely that the caller will conclude that he has not failed in his attempt to contact the intended receiver and will therefore not hang up.

As described below, while the caller hears the modified ringback signal, the modem 10 is waiting to receive a European data modem calling tone, a facsimile calling tone, an identifying DTMF digit 6 from a data modem 22 or an identifying DTMF digit 3 from a faxmodem 23. After the wait period, if no identifying tone has been received, the modem 10 concludes that the caller is a voice caller and voice processing 46 is selected. Voice processing 46 may include the host computer sending a recorded voice message to the caller and/or implementing interactive voice processing including voice storage and playback. Voice processing may also include forwarding the call to a telephone instrument or terminal equipment.

When the modem 10 of the invention detects a ring from an incoming telephone call at the line interface 36, it first answers the call. Next, the modified ringback signal is generated and transmitted via the line interface 36 to the central office 18 over the phone line 16. After the extended initial burst of the modified ringback signal, the control 38 begins to time the wait period during which the modem 10 waits for an identifying signal from the caller. In a preferred embodiment, the control 38 times a wait period of approximately 300 milliseconds.

During the wait period, the control 38 monitors the line from the caller for any incoming signals. If the DTMF digit 6 or a European modem calling tone is received, the control 38 concludes that the caller is a data caller and selects data processing 44 by notifying the host computer. If the control 38 detects a facsimile calling tone or a DTMF digit 3, the control 38 selects facsimile processing 42. At the end of the wait period, the modem 10 informs the host computer 12 of data or facsimile identifyng signals received. If no identifying signal has been received on the phone line from the caller, then the telephone call is processed as a voice call at 46.

A calling data modem 22 or faxmodem 23 may determine that the modified ringback signal is a dial tone well before the 3.0 second duration of the initial tone burst expires. The modem 22 or faxmodem 23 will then send the string of DTMF signals to the modem 10 while the modem 10 is still sending the ringback signal. Under these conditions, the DTMF signals are difficult to detect. In the preferred embodiment, the calling modem 23 or faxmodem 23 sends 17 DTMF signals. This ensures that even under worst-case timing conditions, the modem 10 will see at least one of the DTMF signal after it finishes sending the initial tone burst of the modified ringback signal. This same purpose is served by the two-second delay in the dial strings of the data modem 22 and faxmodem 23 of the alternate embodiment.

It is important that the modem 10 not make multiple reports to the host computer 12 of DTMF signal detections. Therefore in the embodiment in which the calling device sends multiple DTMF signals, after the modem 10 detects a first signal, the control 38 blocks the remaining signals to prevent them from being reported. It does this by setting a timer each time a DTMF signal is received. In the preferred embodiment, the timer is set at approximately 300 milliseconds. When the timer times out without being reset by the detection of another DTMF signal, the control 38 concludes that the last DTMF signal has been received. The single report is then made to the host computer 12.

To place an outgoing telephone call, the modem 10 of the present invention behaves in the same fashion as any standard modem. It receives a dial string and the data to be transmitted from the host computer 12. It dials the phone number of the receiver to establish the communication link. When the link is established, the modem forwards the data to the receiver.

Figure 2:
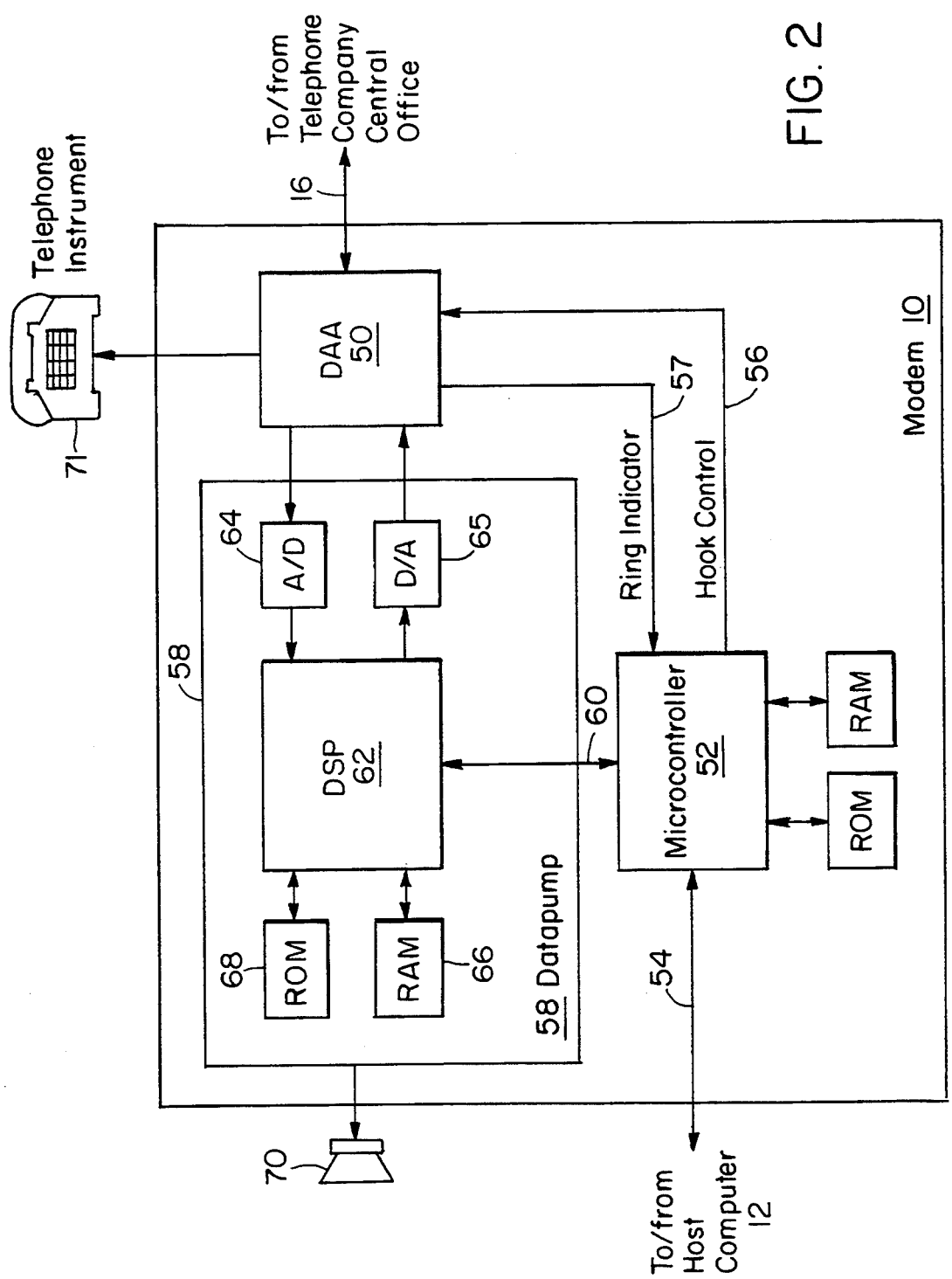
FIG. 2 is a block diagram of the hardware of the modem of the present invention.

FIG. 2 is a block diagram of the hardware of the modem 10 of the present invention. Telephone calls are transmitted and received to and from the telephone company through a Data Access Arrangement (DAA) 50. A ring signal provided by the telephone company central office is typically a nominal 90V$_{RMS}$, 20 HZ signal. When the DAA 50 receives the signal, it transmits a low logic level Ring Indicator signal 57 to a microcontroller 52. When the microcontroller 52 receives the Ring Indicator signal 57, it transmits a message to the host computer 12 over the computer interface 54. In response, the host computer returns a command to the microcontroller 52 to answer the call, and the microcontroller then commands the DAA 50 via a Hook Control signal 56 to go "off-hook."

A datapump 58 of the modem 10 comprises a digital signal processor (DSP) 62 which receives telephone call data from an analog-to-digital converter 64 and transmits telephone call data through digital-to-analog converter 65. The datapump 58 also comprises memories 66 and 68 associated with the DSP 62. The DSP 62 can detect DTMF signals, European modem calling tones and facsimile calling tones. In addition, the DSP 62 can format, generate and transmit signals such as the modified ringback signal on the telephone line through the D/A converter 65 and the DAA 50. The DSP 62 also generates and transmits DTMF signals on the telephone line. Alternatively, signals sent by the modem 10 can be coded by the microcontroller 52 and sent to the DSP 62 as digital samples. When a DTMF is generated, such as when the modem 10 is calling another device, the datapump 58 also transmits signals to a speaker 70 which indicates to a user that a DTMF is being dialed. This function provides feedback to the user to instill confidence that the modem is performing properly.

After an incoming call is answered, the microcontroller 52 commands the datapump 58 via interface 60 to transmit the extended initial tone burst of the modified ringback signal through the DAA 50 to the caller. After the initial tone burst is sent, the microcontroller 52 starts to time the pre-set programmable wait period, which is preferably approximately 300 milliseconds. The DSP 62 monitors the telephone call from the caller via the A/D converter 64. If the DSP 62 detects a facsimile calling tone, or if it detects a DTMF digit 3, it transmits an appropriate signal to the microcontroller 52 which sets a facsimile event flag and resets a data event flag. If the DSP 62 receives the DTMF digit 6 or a European modem calling tone, the microcontroller 52 sets the data event flag and resets the facsimile event flag.

When the 300 millisecond period expires, the microcontroller 52 checks the event flags. If one of them is set, the microcontroller 52 sends an appropriate report to the host computer 12. That is, if the facsimile event flag is set, a facsimile event report is sent, and if the data event flag is set, a data event report is sent. If the host computer 12 receives no report, it begins normal voice processing. This can involve sending a recorded voice message to the caller via the datapump 58 in the modem 10 to initiate interactive voice processing. Alternatively, this may involve forwarding the call to a telephone instrument 71.

After the modem 10 reports the caller to the host computer 12 as being either data or facsimile, the host 12 can command the modem 10 to establish the communication link with the caller by implementing the appropriate handshaking routine. After the communication link is established, the facsimile or data signals from the caller are received through the DAA 50 and then through the A/D converter 64 and are passed over the interface 60 to the microcontroller 52. The microcontroller 52 then passes the data on to the host computer 12 via the interface 54.

To transfer data to another computer, the host computer 12 initiates a data transfer telephone call through the modem 10. The host computer 12 sends a dial string followed by the data to be transferred over the interface 54 to the microcontroller 52. The microcontroller 52 commands the DSP 62 to dial the telephone number. The DSP 62 outputs the appropriate digital signals to the D/A converter 65 which converts the signals to the appropriate DTMF signals to dial the phone number. The DTMF signals are output through the DAA 50 to the telephone line 16 to contact the intended receiver. If the host computer 12 is contacting a standard modem, then the dial string will not contain the commands to wait for a dial tone and dial the DTMF signal. In that case, after the modem 10 detects that the receiver has answered the phone call, the DSP 62 implements the handshaking routine to establish the communication link. After the link is established, the DSP 62 transmits the data to the receiver.

If the receiver modem is designed in accordance with the present invention, the dial string sent by the host computer 12 will include the W6666 . . . command codes. After dialing the number, the DSP 62 will wait until it detects as a dial tone the modified ringback signal from the receiving modem. After it receives the modified ringback signal, it will transmit the string of DTMF 6 digits. The handshaking routine will then be implemented by the receiving modem to establish the link, and the DSP 62 will then forward the data to the receiving modem. If the modem 10 of the invention transfers the data in facsimile format, it will instead transmit a string of DTMF 3 digits.

Figure 3A:
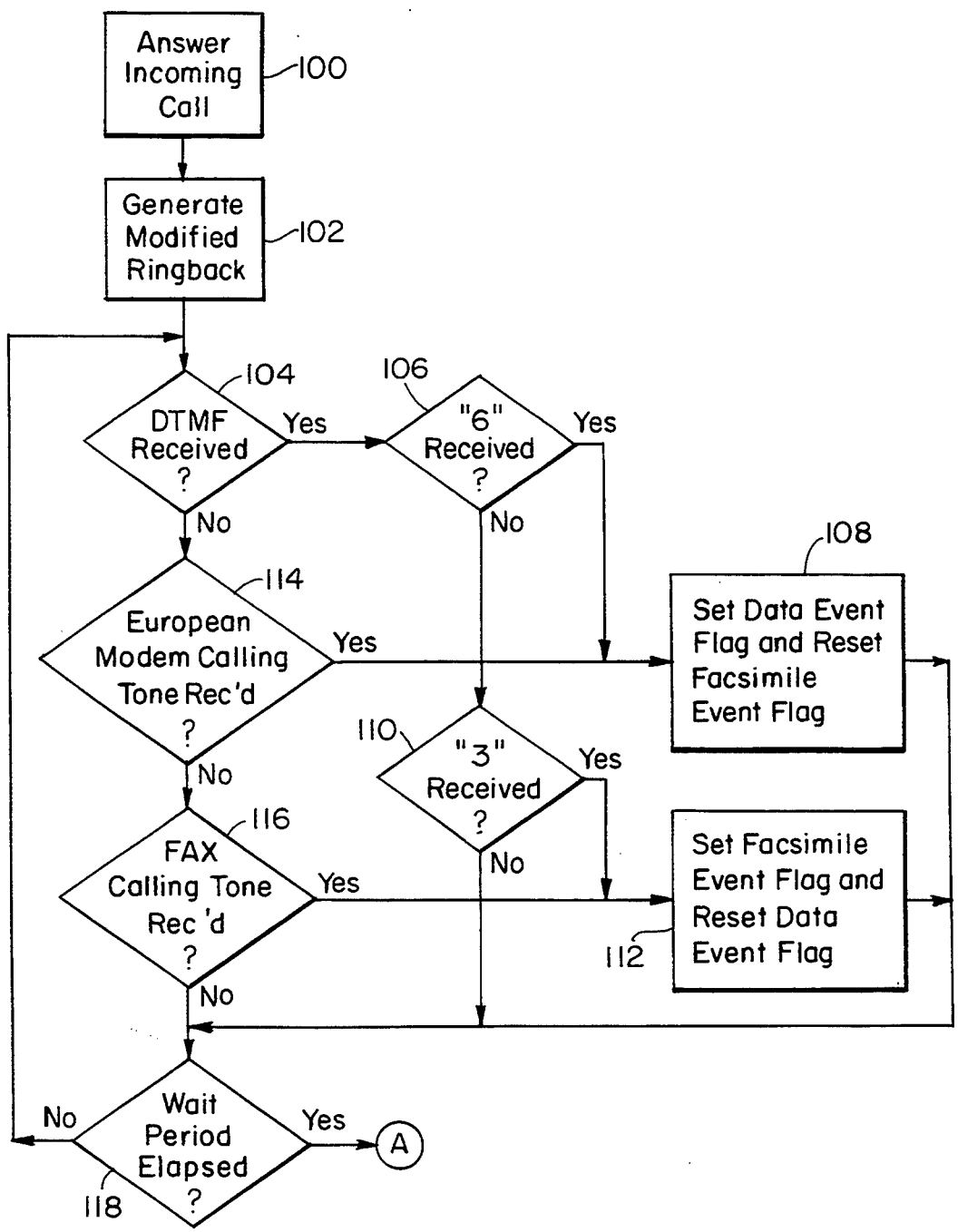
FIGS. 3A and 3B contain a flowchart showing the call processing of the present invention.
Figure 3B:
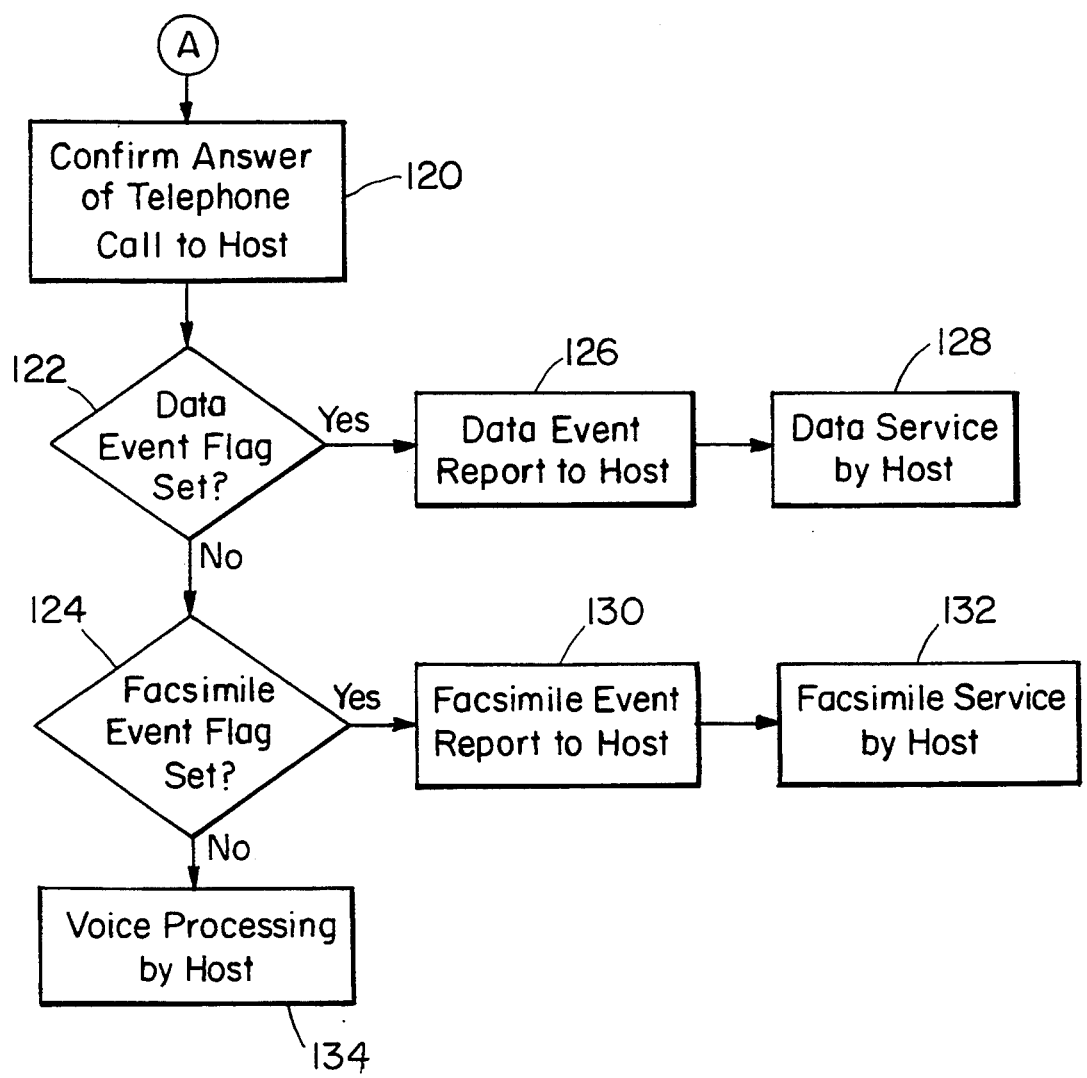

FIGS. 3A and 3B contain a flowchart showing the functional flow of phone call processing in accordance with the present invention. In step 100, the incoming phone call is answered. Next, at step 102, the modified ringback signal is generated and transmitted back to the caller. After generating the ringback signal, the modem waits to receive one of several possible messages. Decision boxes 104, 114, 116 and 118 represent the preferred 300-millisecond wait loop implemented by the modem 10. Decision box 118 shows the control of the wait loop. If the wait period has not elapsed, the modem 10 stays in the loop.

As shown at decision box 104, if a DTMF signal is received, two other decisions 106 and 110 are made. At decision box 106, if the received DTMF signal represents a 6 digit, then the modem 10 sets a data event flag and resets a facsimile event flag at step 108. If the received DTMF digit is a 3, then the modem 10 sets the facsimile event flag and resets the data event flag at step 112. After setting the flags or if neither a 6 nor a 3 is received, the modem 10 returns to the wait loop.

At decision box 114, if a European data modem calling tone is received, then the data event flag is set and the facsimile event flag is reset at step 108. At decision 116, if a facsimile calling tone is received, then the facsimile event flat is set and the data event flat is reset at step 112.

At decision box 118, when the wait period expires, the processing flow proceeds beyond the wait loop as shown in FIG. 3B. It should be noted that FIG. 3B is a continuation of FIG. 3A. The processing flow shown in the two figures is joined at the circles labeled "A."

After leaving the wait loop, the modem first confirms to the host computer at step 120 that the telephone call was answered. Next, at decision boxes 122 and 124, the modem checks the condition of the data event flag and the facsimile event flag. If the data event flag has been set, a data event report is made to the host computer at box 126. In response, the host implements data service at box 128. If the facsimile event flag has been set, a facsimile event report is sent to the host at box 130, and the host begins facsimile service at box 132. If neither of the flags is set, then voice processing is implemented by the host at box 134.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A method of processing an incoming telephone call from a caller, comprising:

sending a modified ringback signal to the caller, the modified ringback signal having substantially the same spectral characteristics as a standard ringback signal such that it appears to a voice caller to be similar to the standard ringback signal and the modified ringback signal having a tone burst with a duration longer than that of the standard ringback signal such that it is detected as a standard dial tone by a non-voice caller monitoring call progress tones, the non-voice caller transmitting an identifying DTMF signal in response to detecting the modified ringback signal as the standard dial tone; and identifying the non-voice caller if the identifying DTMF signal is received from the caller.

2. The method of claim 1 wherein the non-voice caller is a data modem.

3. The method of claim 1 wherein the non-voice caller is a faxmodem.

4. The method of claim 1 further comprising identifying the telephone call as a facsimile call if a facsimile identifying DTMF signal is received from the caller.

5. The method of claim 1 further comprising identifying the telephone call as a data call if a European data modem calling tone is received from the caller.

6. The method of claim 1 wherein the initial tone burst of the modified ringback signal has a duration of about 3.0 seconds.

7. The method of claim 1 wherein:
the non-voice caller transmits a plurality of identifying DTMF signals; and further comprising the step of
delaying until all of the identifying DTMF signals are received before performing the identifying step.

8. The method of claim 1 further comprising identifying the telephone call as a facsimile call if a facsimile calling tone is received from the caller.

9. The method of claim 1 further comprising identifying the telephone call as a data call if a data identifying DTMF signal is received from the caller.

10. The method of claim 1 further comprising identifying the telephone call as a voice call if no identifying signal is received from the caller within a predetermined period of time.

11. The method of claim 10 further comprising routing the telephone call to a telephone instrument.

12. The method of claim 10 further comprising implementing voice storage and playback processing.

13. A device for processing an incoming telephone call from a caller, comprising:

a receiver for receiving the telephone call;

a transmitter for sending a modified ringback signal to the caller, the modified ringback signal having substantially the same spectral characteristics as a standard ringback signal such that it appears to a voice caller to be similar to the standard ringback signal and the modified ringback signal having a tone burst with a duration longer than that of the standard ringback signal such that it is detected as a standard dial tone by a non-voice caller monitoring call progress tones, the non-voice caller transmitting an identifying DTMF signal in response to detecting the modified ringback signal as the standard dial tone; and a processor for identifying the non-voice caller if the identifying DTMF signal is received from the caller.

14. The device of claim 13 wherein the non-voice caller is a data modem.

15. The device of claim 13 wherein the non-voice caller is a faxmodem.

16. The device of claim 13 wherein the processor identifies the telephone call as a facsimile call if a facsimile identifying DTMF signal is received from the caller.

17. The device of claim 13 wherein the processor identifies the telephone call as a data call if a European data modem calling tone is received from the caller.

18. The device of claim 13 wherein an initial tone burst of the modified ringback signal has a duration of about 3.0 seconds.

19. The device of claim 13 wherein:
the non-voice caller transmits a plurality of identifying DTMF signals; and
the processor delays until all of the identifying DTMF signals are received before identifying the non-voice caller.

20. The device of claim 13 wherein the processor identifies the telephone call as a facsimile call if a facsimile calling tone is received from the caller.

21. The device of claim 13 wherein the processor identifies the telephone call as a data call if a data identifying DTMF signal is received from the caller.

22. The device of claim 13 wherein the processor identifies the telephone call as a voice call if no identifying signal is received from the caller.

23. The device of claim 22 wherein the processor routes the telephone call to a telephone instrument.

24. The device of claim 22 wherein the processor initiates voice storage and playback processing.

25. A modem for processing voice, data and facsimile telephone calls, comprising:
a receiver for receiving an incoming telephone call from a caller;
a transmitter for sending a modified ringback signal to the caller, the modified ringback signal having substantially the same spectral characteristics as a standard ringback signal such that it appears to a voice caller to be similar to the standard ringback signal and the modified ringback signal having a tone burst with a duration longer than that of the standard ringback signal such that it is detected as a standard dial tone by a non-voice caller monitoring call progress tones, the non-voice caller transmitting an identifying DTMF signal in response to detecting the modified ringback signal as the standard dial tone;
a timer for timing a predetermined period of time; and
a processor for:
identifying the telephone call as a facsimile call if a facsimile calling tone identifying signal is received from the caller,
identifying the non-voice caller if the identifying DTMF signal is received from the caller, and
identifying the telephone call as a voice call if no identifying signal is received from the caller during the predetermined period of time.

26. The modem of claim 25 wherein the non-voice caller is a data modem.

27. The modem of claim 25 wherein the non-voice caller is a faxmodem.

28. The modem of claim 25 wherein the processor identifies the telephone call as a facsimile call if a facsimile identifying DTMF signal is received from the caller.

29. The modem of claim 25 wherein the processor identifies the telephone call as a data call if a European data modem calling tone is received from the caller.

30. The modem of claim 25 wherein an initial tone burst of the modified ringback signal has a duration of about 3.0 seconds.

31. The modem of claim 25 wherein to process the telephone call as a voice call the processor routes the call to a telephone instrument.

32. The modem of claim 25 wherein to process the telephone call as a voice call the processor initiates voice storage and playback processing.

33. The modem of claim 25 wherein:
the non-voice caller transmits a plurality of identifying DTMF signals; and
the processor delays until all of the identifying DTMF signals are received before identifying the call.

34. The modem of claim 25 wherein the processor identifies the telephone call as a data call if a data identifying DTMF signal is received from the caller.

* * * * *